US006732080B1

(12) United States Patent
Blants

(10) Patent No.: US 6,732,080 B1
(45) Date of Patent: May 4, 2004

(54) SYSTEM AND METHOD OF PROVIDING PERSONAL CALENDAR SERVICES

(75) Inventor: Lioudmila Blants, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/397,003

(22) Filed: Sep. 15, 1999

(51) Int. Cl.$^7$ .............................................. G06F 17/60
(52) U.S. Cl. ...................................................... 705/9
(58) Field of Search ................................ 705/9; 345/963

(56) References Cited

U.S. PATENT DOCUMENTS

| | | | | | |
|---|---|---|---|---|---|
| 5,237,499 | A | * | 8/1993 | Garback ......................... | 705/5 |
| 5,270,920 | A | * | 12/1993 | Pearse et al. ................... | 705/8 |
| 5,519,606 | A | * | 5/1996 | Frid-Nielsen et al. .......... | 705/9 |
| 5,774,867 | A | * | 6/1998 | Fitzpatrick et al. ............. | 705/8 |
| 5,778,346 | A | * | 7/1998 | Frid-Nielsen et al. .......... | 705/9 |
| 5,790,974 | A | * | 8/1998 | Tognazzini ................... | 340/988 |
| 5,855,006 | A | | 12/1998 | Huemoeller et al. | |
| 5,903,845 | A | * | 5/1999 | Buhrmann et al. ..... | 379/211.02 |
| 5,933,778 | A | * | 8/1999 | Buhrmann et al. ..... | 379/211.02 |
| 5,938,721 | A | | 8/1999 | Dussell et al. | |
| 5,948,040 | A | | 9/1999 | DeLorme et al. | |
| 5,963,913 | A | * | 10/1999 | Henneuse et al. .............. | 705/9 |
| 6,064,975 | A | * | 5/2000 | Moon et al. ................. | 345/581 |
| 6,101,480 | A | * | 8/2000 | Conmy et al. .............. | 345/963 |
| 6,167,379 | A | * | 12/2000 | Dean et al. ..................... | 705/8 |
| 6,463,463 | B1 | * | 10/2002 | Godfrey et al. ............. | 709/206 |

FOREIGN PATENT DOCUMENTS

EP 0323702 A2 * 12/1989

OTHER PUBLICATIONS

Sliwa, Carol. "Lotus to Plug Scheduling Applications at Show". Network World. Jan. 15, 1996. vol. 13. Iss. 3.*
Andrew, Paul. "Microsoft Devices Bring Data to your Car, Hand". Seattle Times. Jan. 8, 1999.*
Ratcliffe "(On group apps get upgrades. On Technology Inc. introduces Meeting Maker 1.5. Instant Update 1.0.1)(Product Announcement)", Jan. 1992; MacWEEK, V6, n2, p26(2); Dialog file 275, Accession No. 01496173.*
Tso, M. M. et al—"Always On, Always Connected Mobile Computer", Universal Personal Communications, 1996, Record., 1996 5$^{th}$ IEEE International Conference on Cambridge, MA., USA Sep. 29–Oct. 2, 1996, NEW YORK, NY, USA IEEE US, Sep. 29, 1996, pp. 918–924, XP010198555, ISBN: 0–7803–3300–4, Abstract Section "Infocast: An AOAC Research Vehicle".

* cited by examiner

Primary Examiner—Romain Jeanty
(74) Attorney, Agent, or Firm—Antonelli, Terry, Stout & Kraus, LLP

(57) ABSTRACT

The invention is a system (10) and method for providing personal calendar services. A system providing calendar services in accordance with the invention includes a mobile terminal (12) including a display (14), a processor (34) which controls providing a display on the display of a calendar of a user of the mobile terminal including scheduled calendar user services which are provided to the user of the mobile terminal by at least one user service provider and have associated therewith a scheduled time and at least one location at which the user service is provided to the user; at least one calendaring and scheduling server (20) providing the mobile terminal with a schedule of the scheduled calendar user services which is maintained by the at least one calendaring and scheduling server and which is displayed by the display under control of the calendar software client, each calendaring and scheduling server executing software, which is responsive to a physical location stored therein to schedule at least one scheduled calendar user service for the user of the mobile terminal; and a communication system (16) providing communications between the mobile terminal and the at least one calendaring and scheduling server and between the at least one calendaring and scheduling server and the at least one service provider.

88 Claims, 5 Drawing Sheets

FIG. 3

| EVENT | EVENT TIME | EVENT LOCATION | EVENT LOCATION(S) | EVENT TYPE |
|---|---|---|---|---|
| DRIVE TO AIRPORT | 8:00-8:30 | OULU, STREET A, 101<br>OULU, AIRPORT | x, y, z<br>x, y, z | CAR DRIVE |
| FLIGHT OULU-HELSINKI AY834 | 9:00-10:00 | OULU AIRPORT<br>HELSINKI AIRPORT | x, y, z<br>x, y, z | AIRLINE FLIGHT |
| TAXI TO OFFICE | 9:00-10:00 | 1. HELSINKI AIRPORT<br>2. HELSINKI ITAMERENKATU 11 | x, y, z<br>x, y, z | CAR DRIVE |
| PROJECT MEETING IN NOKIA HELSINKI OFFICE | 10:00-15:00 | HELSINKI ITAMERENKATU 11 | x, y, z | OFFICE MEETING |
| PAYMENT OF MORTGAGE | ANYTIME (PAY WHEN AT PROJECT MEETING IN NOKIA HELSINKI OFFICE) | DOWNTOWN HELSINKI | x, y, z | PAYMENT |

14

SYSTEM AND METHOD OF PROVIDING PERSONAL CALENDAR SERVICES

BACKGROUND OF THE INVENTION

1. Field of the Invention

The present invention relates to systems and methods of providing calendar services.

2. Description of the Prior Art

Electronic calendars for mobile terminals are currently in use. These electronic calendars permit updating and viewing of scheduled events by users of the mobile terminals. Additionally, alerts and notifications may be provided to the users. Information from external databases may be used by the personal calendar in the scheduling of events. Navigation systems for vehicles provide travelers access to information involving a route of travel, but do not schedule services for the traveler dependent on the route of travel. Furthermore, electronic calendars deployed in mobile terminals may be synchronized with organizational calendars so as to coordinate the user's personal mobility with an organization for which the user works or otherwise for which the user provides or receives scheduled services.

U.S. Pat. Nos. 5,732,399, 5,790,974, 5,842,009 and 5,855,066 disclose examples of personal calendars.

U.S. Pat. No. 5,732,399 associates the scheduling of events with electronic documents. A display specifies scheduled events but the system's operation is not responsive to the user's location.

U.S. Pat. No. 5,790,974 describes a mobile personal calendar connected with an office calendar system which coordinates the mobile user's calendar and the user's organization. The '974 Patent identifies conflict situations when the user of the mobile personal calendar is travelling and the current location of the user presents a conflict to the user reaching a scheduled appointment. The personal mobile calendar determines from traffic and other information and the user's current position if a rescheduling change can be accommodated. When there is no conflict, the rescheduled item is added to the calendar display. However, while the '974 Patent describes the identification of travel conflicts which are detected as a consequence of the user's current position, there is no rescheduling by the calendar of services with a service provider dependent upon a stored location.

U.S. Pat. No. 5,842,009 describes a portable calendar providing a user with documents and information relevant to a scheduled event. Queries are automatically formulated to elicit information about the stored scheduled event. The operation of the calendar is not dependent on the location stored within the calendar associated with events scheduled in the calendar.

U.S. Pat. No. 5,855,006 discloses a personal calendar providing the user with information related to a scheduled activity and the capability of making reservations and purchasing tickets. The operation of the calendar is not dependent on the location stored within the calendar associated with events scheduled in the calendar.

SUMMARY OF THE INVENTION

The present invention is a method and system for providing calendar services to a user of a mobile terminal which affords the user of the mobile terminal worldwide access to scheduled services from service providers and/or information services provided from information service providers. The calendar services are dependent upon location information stored in a calendaring and scheduling server from which the mobile terminal receives the calendaring information displayed by the user's mobile terminal to inform the user of calendar events. The calendar services are provided by a calendar resident in at least one calendaring and scheduling server which communicates with a user of the mobile terminal by a communication system. The services may be scheduled user services having particular properties of time and location which are provided to the user by at least one service provider or which are provided as on-time information services provided by an information service provider. The calendar services include scheduling and rescheduling services provided by a user service provider to the user of the mobile terminal and the providing of alerts to perform unscheduled events.

Scheduled services are rescheduled when a conflict in the user's schedule between different services as to time and/or location, which is dependent on a position stored in the calendar, is detected. With the invention, a location stored in the calendar controls services provided to the user of the mobile terminal and/or the generation of alerts that events not scheduled as to time should be performed as a result of the user of the mobile terminals actual position or scheduled position. A location signal indicating the current location of the mobile terminal may be used in the aforementioned providing of scheduled services or alerts to generate the stored location and may be generated by a GPS receiver located in the mobile terminal or, alternatively, provided by a communication system to which the mobile terminal is connected. At least one calendaring and scheduling server provides the mobile terminal with an identification of the scheduled services and other events which are displayed by the calendar. The software executed by the at least one calendaring and scheduling server, which may be responsive to either the actual location of the mobile terminal or a location associated with calendar events, signals when a conflict exists as a result of the mobile terminal's current location or a location involving a scheduled calendar service that prevents the user of the mobile terminal from obtaining the scheduled calendar service. The software executed by the at least one calendaring and scheduling server controls communications with at least one user service provider server to schedule a calendar service or reschedule a scheduled calendar service so that a scheduling conflict does not exist. Additionally, at least one information service provider server is in communication with the mobile terminal which provides the mobile terminal with on line or other information sources which relate to the stored location and provide the user of the mobile terminal with useful information when the user is located physically at the stored location such as, but not limited to, the user travelling to the location stored in the at least one calendaring and scheduling server.

The at least one calendaring and scheduling server or a separate profile server which interacts with the at least one calendaring and scheduling server stores a personal profile or set of profiles of the user of the mobile terminal which are used by the software of the at least one calendaring and scheduling server to schedule services from information and user service providers. The profile(s) of the user specify the personal service providers which provide the user with scheduled calendar services and the information service providers the user likes to use as sources of on line information. The selected information service providers and user service providers may be service providers the user prefers, has used in the past, or which have been selected by some other party as being suitable such as, for example, any employer. The users are given unique user accounts which permit a single mobile terminal to be used by multiple users. Service specific profiles containing additional information useful for defining the individual profile(s) of each user may be stored by service providers providing scheduled services. The user profile is initially created by the user or a party having a contractual relationship to the proprietor of the at least one calendaring and scheduling server. If the user is an employer who provides the mobile terminal(s) to employees, arrangements may be made with preferred service providers including rates for services and delivery features to be obtained. The profile(s) may also be updated based upon user history and the context of the user's history. The profile may desirably have a home location which may be the user's home or office location etc.

The calendar stored by the at least one calendaring and scheduling server which is transmitted to the mobile terminal for display contains a number events which each have a number of properties such as location and time. Location is a significant control parameter in the at least one calendaring and scheduling server providing of calendar services. The mobile terminal itself has a physical location which may be detected by a communication system in which the mobile terminal functions or by a GPS function built into the mobile terminal.

The operation of the invention in essence connects together information services and service providers which provide scheduled calendar services with at least one calendaring and scheduling server and a mobile terminal which provides the user of the mobile terminal an aggregate of calendar services which are related to a current or scheduled location of the user. The at least one calendaring and scheduling server maintains the calendar and updates the calendar as the location of events in the calendar changes, such as scheduled user services and the receipt of information services at a specified time, which are provided to the user by at least one service provider or information service provider.

The mobile terminal includes a memory storing an application program which provides the display of calendar information, such as generic short message service, but in a preferred embodiment, is a calendar software client application program which provides the mobile terminal with the functionality of a calendar type device including processing of calendar information received from the at least one calendaring and scheduling server. The calendar software client application program also controls the transmission of user inputted information to the at least one calendaring and scheduling server.

A system providing calendar services in accordance with the invention includes a mobile terminal including a display, a processor which controls providing a display on the display of a calendar of a user of the mobile terminal including scheduled calendar user services which are provided to the user of the mobile terminal by at least one user service provider and have associated therewith a scheduled time and at least one location for which the user service is provided to the user; at least one calendaring and scheduling server providing the mobile terminal with a schedule of the scheduled calendar user services which is maintained by the at least one calendaring and scheduling server and which is displayed by the display under control of the processor, each calendaring and scheduling server executing software, which is responsive to a location stored therein to schedule at least one scheduled calendar user service for the user of the mobile terminal; and a communication system providing communications between the mobile terminal and the at least one calendaring and scheduling server and between the at least one calendaring and scheduling server and the at least one service provider. The stored location may be a physical location of the mobile terminal or a stored physical location for which the calendaring and scheduling server has scheduled a scheduled calendar user service to be provided to the user. The software of one of the at least one calendaring and scheduling server may determine that a scheduling conflict exists which prevents the user of the mobile terminal from receiving a scheduled calendar user service at a specified time and physical location and may control communications by the communication system with the at least one service provider or another entity in communication with the at least one service provider to change the scheduled calendar user service to avoid the conflict. At least one information provider server may be provided in communication with the at least one calendaring and scheduling server which provides calendar information service by providing information which is stored by the at least one information provider server to the user by transmission with the communication system to the mobile terminal under control of one of the at least one calendaring and scheduling server. The calendar information service provided by the at least one information provider server may be selected as a function of a location stored in at least one calendaring and scheduling server associated with a scheduled calendar user service. The information provided by the at least one information provider server may be transmitted to the user of the mobile terminal after the user has moved to a new physical location stored in the at least one calendaring and scheduling server and is information selected to be useful to the user at the new physical location. The at least one calendaring and scheduling server may store information displayed by the display under control of the processor and a profile of the user providing information about preferences of the user regarding the scheduled calendar services; and the software of the at least one calendaring and scheduling server may access and use the profile of the user in providing at least the scheduled calendar user services to the user of the mobile terminal. The profile of the user may contain at least one preferred user service provider which may be chosen to provide service to the user and the at least one preferred user service provider may be given preference by the software in scheduling the scheduled calendar user services over any other user service provider which may be chosen to provide the user the scheduled calendar user services. The user profile may store additional information for selecting between a plurality of user service providers to provide more than one scheduled calendar user service to the user. The software of the at least one calendar and scheduling server further may be responsive to the physical location stored therein to generate an alert which is transmitted to the mobile terminal which informs the user that the user should perform an unscheduled activity while the user is in a physical proximity to the stored physical location. The unscheduled activity may be an activity which may be performed by the user independent of time. The software of the calendar and scheduling server further may schedule at least one item in the calendar for the user is associated with the new physical location. The software of the calendar and scheduling server further may schedule at least one item in the calendar for the user is associated with the new physical location. The at least one item may be a scheduled user service to be provided to the user while the user is at the new physical location. The at least one item may be delivery of information to the user from at least one information provider server while the user is at the new physical location. The information may be subject matter useful to the user while the user is in the new location.

A system providing calendar services in accordance with the invention includes a mobile terminal including a display, a processor which controls providing a display on the display of a calendar of a user of the mobile terminal including scheduled calendar services which are provided to the user of the mobile terminal; and at least one calendaring and scheduling server providing the mobile terminal with a calendar of events which are displayed by the display under the control of the calendar software, each calendaring and scheduling server executing software which is responsive to a physical location stored therein where the user is scheduled by the software of the at least one calendaring and scheduling server to be present to generate an alert which is transmitted to the mobile terminal which informs the user that the user should perform an activity independent of time while the user is in physical proximity to the stored physical location. The stored physical location may be the physical location of the mobile terminal. The stored physical location may be a physical location at which the calendaring and scheduling server has scheduled a calendar user service to be provided to the user.

A method of providing calendar services in a system including a mobile terminal including a display, a processor which controls providing a display on the display of a calendar of a user of the mobile terminal including scheduled calendar user services which are provided to the user of the mobile terminal by at least one user service provider and have associated therewith a scheduled time and at least one location for which the user service is provided to the user, at least one calendaring and scheduling server providing the mobile terminal with a schedule of the scheduled calendar user services which is maintained by the at least one calendar scheduling server and which is displayed by the display under control of the processor and a communication system providing communications between the mobile terminal and the at least one calendaring and scheduling server and between the at least one calendaring scheduling server and the at least one service provider in accordance with the invention includes storing a location in one of the at least one calendaring and scheduling server; in response to the stored location, the software of the one calendaring and scheduling server schedules at least one scheduled calendar user service for the user; transmitting the at least one scheduled calendar user service for the user to the mobile terminal; and displaying the at least one scheduled calendar user service on the display. The stored location may be a physical location of the mobile terminal or a physical location for which the calendaring and scheduling server has scheduled a scheduled calendar service to be provided to the user. The software of one of the at least one calendaring and scheduling server may determine that a scheduling conflict exists which prevents the user of the mobile terminal from receiving a scheduled calendar user service at a specified time and physical location and may control communications by the communication system with the at least one service provider or another entity in communication with the at least one service provider to change the scheduled calendar user service to avoid the conflict. At least one information provider server is provided, in communication with the at least one calendaring and scheduling server which provides calendar information service by providing information which is stored by the at least one information provider server to the user by transmission with the communication system to the mobile terminal under control of one of the at least one calendaring and scheduling server. The calendar information service provided by the at least one information provider server may be selected as a function of a location stored in at least one calendaring and scheduling server associated with a scheduled calendar user service. The information provided by the at least one information provider server may be transmitted to the user of the mobile terminal after the user has moved to a new physical location stored in the at least one calendaring and scheduling server and is information selected to be useful to the user at the new physical location. The at least one calendaring and scheduling server may store information displayed by the display under control of the processor and may store a profile of the user providing information about preferences of the user regarding the scheduled calendar services; and the software of the at least one calendaring and scheduling server may access and use the profile of the user in providing at least the scheduled calendar user services to the user of the mobile terminal. The profile of the user may contain at least one preferred user service provider which may be chosen to provide service to the user and the at least one preferred user service provider may be given preference by the software in scheduling the scheduled calendar user services over any other user service provider which may be chosen to provide the user the scheduled calendar user services. The user profile may store additional information for selecting between a plurality of user service providers to provide more than one scheduled calendar user service to the user. The software of the at least one calendar and scheduling server further may be responsive to the physical location stored therein to generate an alert which is transmitted to the mobile terminal which informs the user that the user should perform an unscheduled activity while the user is in a physical proximity to the physical location. The unscheduled activity may be an activity which may be performed by the user independent of time. The software of the calendar and scheduling server further may schedule at least one item in the calendar for the user is associated with the new physical location. The at least one item may be a scheduled user service to be provided to the user while the user is at the new physical location. The at least one item may be a delivery of information to the user from at least one information provider server while the user is at the new physical location.

A system providing calendar services in accordance with the invention includes a mobile terminal including a display, a processor which controls providing a display on the display of a calendar of a user of the mobile terminal including scheduled calendar user services which are provided to the user of the mobile terminal by at least one user service provider and have associated therewith a scheduled time and at least one location at which the user service is provided to the user; at least one calendaring and scheduling server providing the mobile terminal with a schedule of the scheduled calendar user services which is maintained by the at least one calendaring and scheduling server and which is displayed by the display under control of the processor, at least one calendaring and scheduling server executing software, which is responsive to a location stored therein, to schedule at least one calendar user service for the user of the mobile terminal and in response to confirmation that the calendar user service has been completed, scheduling at least one additional item related to completion of the calendar user service; and a communication system providing communications between the mobile terminal and the at least one calendaring and scheduling server and between the at least one calendaring and scheduling server and the at least one service provider. The at least one additional item may be independent of a location of the mobile terminal at a time the calendar user service was completed.

A method of providing calendar services in a system including a mobile terminal including a display, a processor which controls providing a display on the display of a calendar of a user of the mobile terminal including scheduled calendar user services which are provided to the user of the mobile terminal by at least one service provider and have associated therewith a scheduled time and at least one location at which the service is provided to the user, at least one calendaring and scheduling server providing the mobile terminal with a schedule of the scheduled calendar services which is maintained by the at least one calendar scheduling server and which is displayed by the display under control of the processor and a communication system providing communications between the mobile terminal and the at least one calendaring and scheduling server and between the at least one calendaring scheduling server and the at least one service provider in accordance with the invention includes storing a location in at least one of the at least one calendaring and scheduling server; in response to the stored location, the software of the at least one calendaring and schedules server scheduling at least one calendar service for the user and in response to confirmation that the calendar service has been completed, scheduling at least one additional item related to completion of a calendar service; transmitting the at least one scheduled calendar service to the mobile terminal; and displaying the at least one scheduled calendar service on the display. The at least one additional item may be independent of a location of the mobile terminal at a time the calendar service has been completed.

BRIEF DESCRIPTION OF THE DRAWINGS

FIG. 3 is a screen display of scheduled activities produced by the calendar of the present invention.

Like reference numerals identify like parts throughout the drawings.

DESCRIPTION OF THE PREFERRED EMBODIMENTS

The present invention provides improved calendar services facilitating the user of a mobile terminal to obtain worldwide calendaring services from a calendaring and scheduling service including access to user services and information services. The addition of user and information service access to a calendar application program makes the calendar function much more robust than in the prior art. In accordance with the invention, information services provide information which is useful to the terminal user and may or may not have a scheduled time of delivery. When the information services have a scheduled time of delivery, they may be treated as scheduled user services. User services have properties of time and place with the place of delivery being either in the physical world or in the virtual world.

Figure 1:
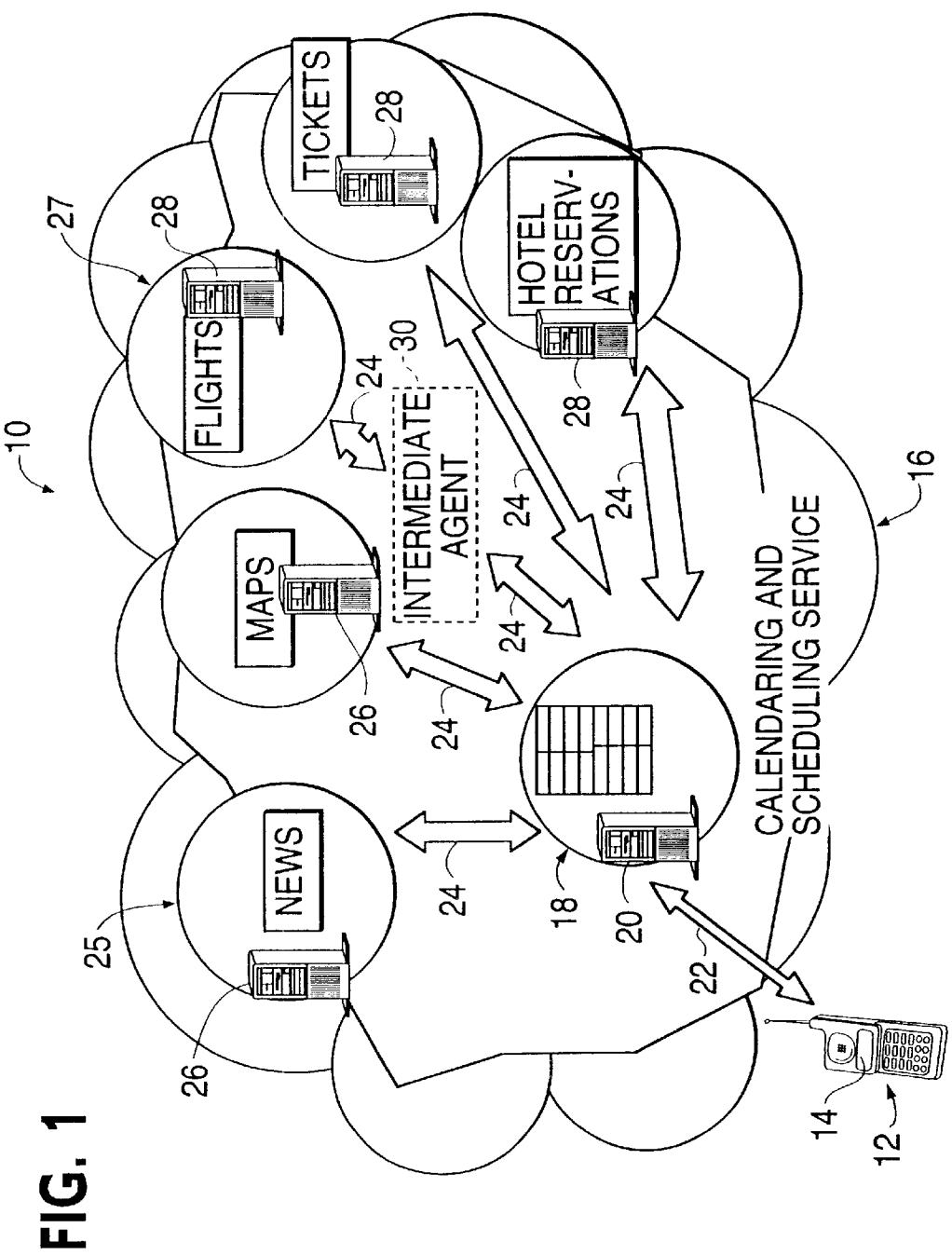
FIG. 1 is a block diagram of an embodiment of system providing calendar services in accordance with the invention.

FIG. 1 illustrates a block diagram of a first embodiment 10 of a system for providing mobile calendar services in accordance with the invention. The system architecture is comprised of a plurality of mobile terminals 12 (only one has been shown to simplify illustration of the invention) which have resident therein a software client application program of the type which provides the well-known display of a personal calendar on a display 14 and supports interaction with a calendaring and scheduling service 18 having at least one calendaring and scheduling server 20 which maintains the calendar. The mobile terminal 12 also is part of a telecommunications system 16 which provides mobile communications to the mobile terminal 12 and communications with various servers and/or intermediate agents as described below. The telecommunications system 16 places a user (not illustrated) of the mobile terminal in communication with on-line servers and intermittent agents throughout the world which facilitates the users' obtaining of user services and information services as described below. The communication system 16 is hybrid in nature and provides mobile telephone and packet data communication capability (IP) and may be of any known hybrid design, such as one of GSM, CDMA, FM cellular, or PCS communications interfaced with an IP network. The calendaring and scheduling service 18 maintains and provides the mobile terminal with a calendar schedule to be displayed by the display 14. The display 14 of the calendar may be in accordance with any known system.

Each of the at least one calendaring and scheduling servers 20 executes software to provide the user of the mobile terminal with diverse types of scheduled user calendar services and information services.

In one embodiment, the software schedules calendar services on behalf of the user from at least one user service provider which have associated therewith a scheduled time and at least one location at which the user service is provided to the user. The at least one calendaring and scheduling server 20 transmits to the mobile terminal 12 a schedule of the scheduled calendar user services and which is displayed by the display 14 under the control of the calendar software client. Each calendaring and scheduling server 20 executes software, which is responsive to the location stored therein, to schedule at least one scheduled calendar user service for the user of the mobile terminal as described below.

In another embodiment, the software provides scheduled calendar services which are provided to the user of the mobile terminal 12 and the at least one calendaring and scheduling server 20 provides the mobile terminal with a calendar of events which are displayed by the display 14 under the control of the calendar software. Each calendaring and scheduling server executes software which is responsive to a location stored therein where the user is scheduled by the software of the at least one calendaring and scheduling server to be present. The software controls generation of an alert which is transmitted to the mobile terminal which informs the user that the user should perform an activity independent of time while the user is in physical proximity to the stored location.

In a further embodiment, the software provides scheduled calendar user services which are provided to the user of the mobile terminal 12 by at least one user service provider 27 and have associated therewith a scheduled time and at least one location at which the user service is provided to the user, and at least one calendaring and scheduling server 20 provides the mobile terminal with a schedule of the scheduled calendar user services which is maintained by the at least one calendaring and scheduling server and which is displayed by the display under the control of the calendar software client. The at least one calendaring and scheduling server 20 executes software, which is responsive to a location stored therein, to schedule at least one calendar user service for the user of the mobile terminal 12 and in response to confirmation that the calendar user service has been completed, schedules at least one additional item related to completion of the calendar user service. The at least one additional item may without limitation involve payment or billing for the scheduled service.

Each of the calendaring and scheduling servers 20 is connected to the at least one mobile terminal device 12 by a wireless link 22 which is supported by the communications system 16. The at least one calendaring and scheduling server 20 further communicates preferably without limitation using a packet data transmission 24, such as IP or by other telecommunications techniques, to a plurality of information service providers 25 having information service servers 26 which, without limitation, provide information services such as news, maps, etc., from anywhere in the world. The information service servers 26 provide general or specialized information services useful to the user of the mobile terminal 12 in a home location (e.g., local news) or in a new location to which the user has traveled in receiving or is to receive a scheduled calendar user service from a user service provider 27, such as an airline, hotel or provider of performances.

The at least one calendaring and scheduling server 20 further communicates using packet data transmissions, such as IP or by other telecommunications techniques 24, to a plurality of user service provider servers 28 associated with the user service providers which, without limitation, provide scheduled calendar user services, such as travel services, access services to performances requiring tickets and lodging services. Finally, the at least one calendaring and scheduling server 20 may optionally further communicate using packet data transmission, such as IP or by other telecommunications techniques 24, with the user service provider servers 28 through intermittent agents 30, which function as intermediaries when direct access to the user service provider servers is not available for any reason. The intermediate agent 30 is analogous to a travel agent and performs booking functions when the calendaring and scheduling server is not directly scheduling the scheduled calendar user services.

The software of the at least one calendaring and scheduling server uses a stored location as a control parameter for scheduling the user's calendar to obtain access to information service providers 25 and user service providers 27 from the information service servers 26 and service provider servers 28 respectively. The stored location may be without limitation a physical location at which the calendaring and scheduling server 20 has scheduled a calendar user service to be provided to the user or a physical location of the mobile terminal 12 which is determined by the communication system 16 using known network techniques for determining the location of mobile terminals or with a GPS receiver which is an integral part of the mobile terminal 12 which transmits to the network current position information (x, y and z coordinates). Furthermore, the stored location may be in the virtual world.

The software of the at least one calendaring and scheduling server 20 performs the following additional functions which provide a more robust calendar service than in the prior art:

(1) The software determines that a scheduling conflict exists which prevents the user of the mobile terminal 12 from receiving a scheduled calendar user service at a specified time and location and controls communications by the communication system 16 with at least one information service provider 25 or user service provider 27 or another entity 30 in communication with the at least one service provider to change the scheduled service to avoid the conflict.

(2) The software controls communications with the at least one information service server 26 to provide information which is stored by the at least one information provider server to the user of the mobile terminal 12 by transmission with the communication system 16 to the mobile terminal. The calendar information service provided by the at least one information provider server 26 is selected as a function of a location stored in at least one calendaring and scheduling server 20 associated with a scheduled calendar user service. The information provided by the at least one information provider server 26 may be transmitted to the user of the mobile terminal after the user has moved to a new physical location stored in the at least one calendaring and scheduling server 20 and may be information selected to be useful to the user at the new physical location.

(3) The software controls the at least one calendaring and scheduling server 20 to store information which is transmitted to the mobile terminal 12 and displayed by the display 14 under the control of the calendar software client and a stored personal profile of the user or a set of profiles of the user providing information about preferences of the user regarding the scheduled services is used in scheduling at least the scheduled services to the user of the mobile terminal. Alternatively, a separate profile server (not illustrated), which is associated with and interacts with at least one calendaring and scheduling server 20, stores the personal profile or set of personal profiles. The profile(s) of the user contains at least one preferred information service provider 25 which may be chosen to provide information service to the user and/or at least one user service provider 27 which may be chosen to provide user services to the user. The at least one preferred information service provider 25 and the at least one user service provider 27 are given preference by the software in scheduling over any other information service providers and/or service providers which may be chosen to provide the user the scheduled services.

(4) The software further is responsive to the location stored by the at least one calendar and scheduling server 20 to generate an alert which is transmitted to the mobile terminal 12 which informs the user that the user should perform an unscheduled activity while the user is in a physical proximity to the stored location. The unscheduled activity may be an activity which may be performed by the user independent of time.

(5) The software may schedule at least one item in the calendar for the user which is associated with a new physical location to which the user has traveled such as when the user receives a scheduled service in the new location. The at least one item may be a scheduled user service to be provided to the user while the user is at the new physical location. The at least one item may be delivery of information to the user from at least one information provider server 26 while the user is at the new physical location. The information may be subject matter selected to be useful to the user while the user is in the new location such as, but not limited to, information having significance in only the new location which is useful to the user while in the new location.

(6) The software may be responsive to the location stored in the at least one calendaring and scheduling server 20, to schedule at least one information service or user service for the user of the mobile terminal 12 and, in response to confirmation by communications over link 24 that the information service or user service has been completed, which is provided by one of the information service providers 25 or user service providers 27, scheduling at least one additional item related to completion of the calendar service. The at least one additional item may be independent of the location of the mobile terminal 12 at a time the calendar service was completed and may be, without limitation, any event connected to completion, such as billing or payment for the completed service and is independent of calendar conflicts.

Figure 2:
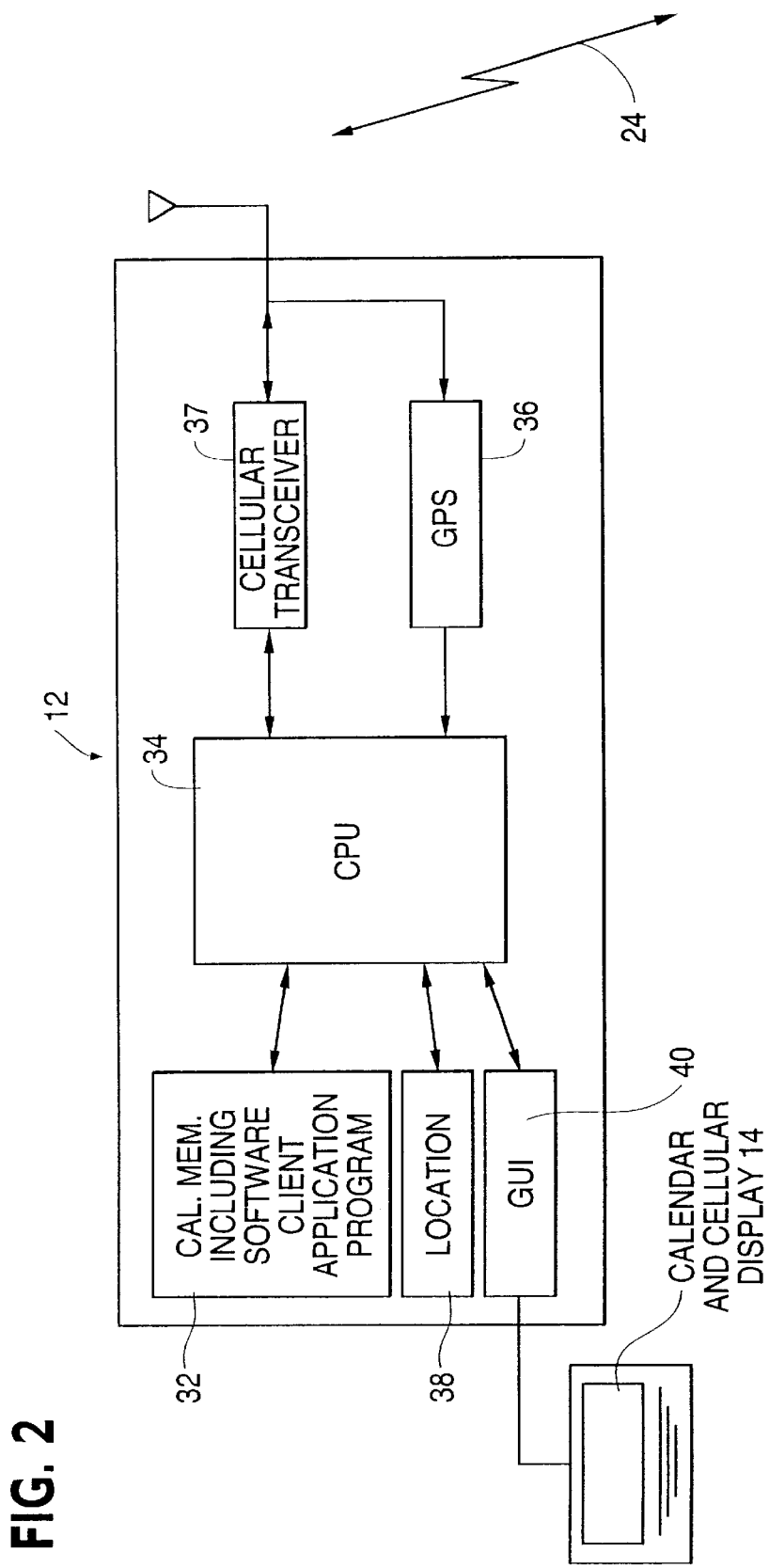
FIG. 2 is a block diagram of the mobile terminal of the embodiment of FIG. 1.

FIG. 2 illustrates a block diagram of an exemplary embodiment of the mobile terminal 12 which may be used to practice the invention but it should be understood that the invention is not limited thereto. The mobile terminal 12 includes the calendar software client application program, which is stored in the calendar memory 32 which is executed by CPU 34, which is responsive to a location signal produced by GPS receiver 36 if the current location of the mobile terminal is to be generated locally. A standard cellular transceiver 37 connects the mobile terminal 12 to the communication system 16 to provide connectivity to all of the servers 20, 26 and 28 and optional at least one personal profile server(s) (not illustrated). The resident calendar software client application program controls display of the scheduled calendar by the mobile terminal 12 which is maintained by the at least one calendaring and scheduling server 20 and displays regarding the received scheduled calendar including the inputting of user selections and data which are necessary to complete the obtaining of information and user services from the various information service providers and user service providers 25 and 27 respectively which are connected to the communication system 16. The mechanism by which the displays are generated is conventional and is not part of the invention. If a GPS receiver 36 is present, a position signal is transmitted by the communications 22 to the at least one calendaring and scheduling server 20 where the current position may be used by the software for those functions of the calendaring and scheduling server which require current mobile terminal position. Alternatively, the position of the mobile terminal 12 may be determined by a cellular network which is part of the communication system 16 providing connectivity to the mobile terminal. The position signal may be used by the scheduling software to detect scheduling or rescheduling conflicts and to generate alerts for unscheduled events.

The detection of conflict involves comparison of the time and place of a scheduled calendar user service, such as those provided by user service providers 27, with either the current position of the mobile terminal or a future position of scheduled calendar user services to identify incompatible calendar events. For example, a delay by the user in timely reaching a scheduled user service location, which is determined by the position signal, can result in subsequent scheduled user services being impossible to be obtained by the user because of an impossibility to be in the place of the scheduled position. In this event, the software uses the personal profile of the user (if present in the at least one calendaring and scheduling server 20) to reschedule the subsequent scheduled calendar user service(s) to provide sufficient time for the user to be able to reach the location at which the user will receive the subsequent scheduled calendar user service(s). Another example involves initial scheduling of a user service provider servers 28 to provide scheduled calendar user services which requires the initial scheduling to take into account the time and location of each scheduled calendar user service to permit the user to reach the location of each of the series of scheduled calendar user services.

The profile of the user in the at least one calendaring and scheduling server 20 may store at least one preferred information service provider 25 and/or preferred user service provider 27 for providing each type of service which the user wishes to obtain from an information and/or a user service provider by use of the calendaring and scheduled service. The software, which is executed by the at least one calendaring and scheduling server 20, gives preference in scheduling and rescheduling of a service with preferred information or service providers over any other information or service providers which can offer the information or user services, including but not limited to, scheduling or rescheduling of the scheduled services resultant from the current or scheduled location of the mobile terminal 12 causing the scheduling software to detect a scheduling conflict which prevents the user of the mobile terminal from receiving a scheduled service or attempting to schedule a service provided by a service provider for the first time. The profile of the user may store additional information for selecting more than one preferred information and/or service provider to schedule or reschedule the service on which the conflict exists. The personal profile may store other information expressing the user's preferences, such as price, etc.

A location register 38 stores the current location of the mobile terminal 12 which is obtained from the GPS receiver 32. A graphical user interface 40 functions as a display driver for the display 14 which displays the calendar of the user and optionally a display of cellular communication information. Furthermore, it should be understood that multiple displays could be utilized in the mobile terminal with one of the displays being particularly suited for cellular communications and another display, which is much larger, being suited for displaying of a personal calendar.

FIG. 3 illustrates an example of a personal calendar which is displayed by the calendar and cellular display 14 of FIG. 2. It should be understood that the present invention is not limited to any particular calendar content or display format. The top four row entries are scheduled events and the bottom row entry is an unscheduled event. Scheduled events are scheduled or rescheduled in dependence upon the location and time stored by the software of the at least one calendaring and scheduling server 20. Unscheduled events are identified for performance by dependence upon the actual or scheduled location of the mobile terminal 12 and are highlighted for performance by the generation of a location dependent alert based upon the position of a scheduled event or the actual position of the mobile terminal 12.

The software of the at least one calendaring and scheduling server 20 determines that an alert should be generated by comparing the position of all scheduled events and possibly a route of travel between scheduled events and any other information relevant to future position of the user to determine if the user of the mobile terminal 12 is going to be in proximity of the place of an event which is unscheduled in time but is location dependent and related to a current location of the user or a scheduled location of the user such as receiving a user service from a user service provider 27. For example, the project meeting which is the last scheduled row entry of FIG. 3, is assumed to be in proximity to the bank in downtown Helsinki where payment of the mortgage would occur. The software causes an alert to be generated which may be, as indicated in parenthesis, "pay when at project meeting in Nokia Helsinki office" being displayed in the "Event time" below "Anytime" or any other type of visual or other alert so as to alert the user that an alert has been added to the display.

As illustrated the display includes four categories of information which are "event", "event time", "event location (s)", and "event type". In the display 14, the content of the aforementioned four categories includes the x, y, and z position coordinates which may be derived from the aforementioned GPS receiver 36 or if x, y coordinates are used, also from the network 16. The flight identified in the second row of the calendar 14 is a scheduled service provided by a user service provider 27 (airline) which the present invention will schedule or reschedule upon detection of a conflict. The remaining scheduled events which are driving to the airport, taking a taxi to the office, and a meeting, do not involve scheduled user service providers and are of the type of information normally displayed by a calendar. These events, in accordance with the invention, may be scheduled as dependent upon the completion of the flight to Helsinki which may be scheduled as a scheduled user service 27 activity. It should be understood that the display 14 is only an example of a display in accordance with the present invention with the present invention not being limited to any particular type of display.

Figure 4:
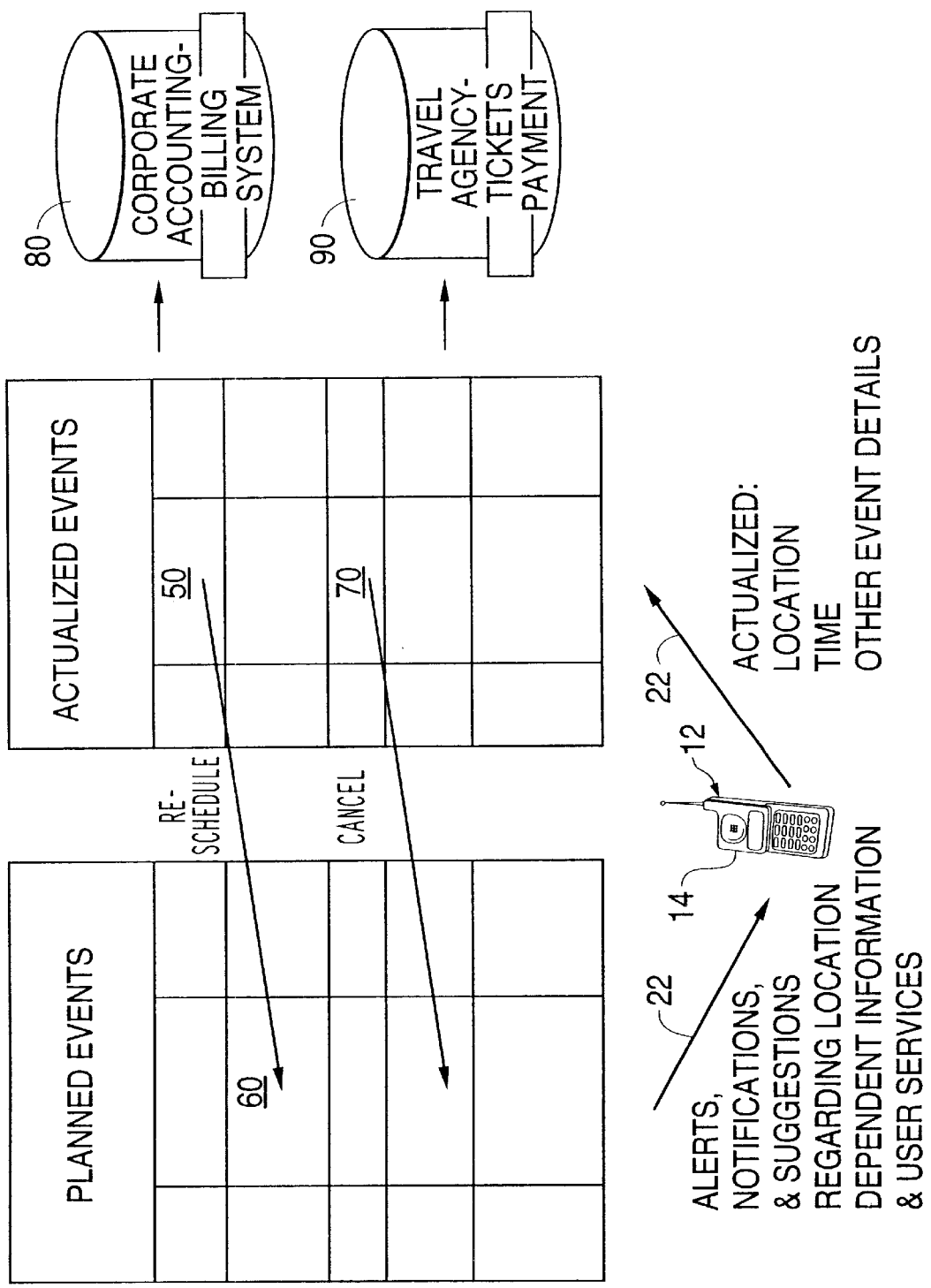
FIG. 4 illustrates the scheduling interaction between events which have occurred and events which are planned.

FIG. 4 is a conceptual diagram illustrating the sequence of subsequent events which occur after a scheduled user service has been completed. Actualized events represent the completed user services and planned events represent the scheduled user services which are provided by the user service providers 27.

Actualized events, in accordance with the invention cause subsequent events, which are not dependent on location, to occur, such as the activation of a corporate accounting billing system 80 to bill the responsible party or user for the completed user service, e.g. airline tickets, or the making of a travel agency ticket payment 90. Neither event of billing or payment is position dependent and further, both events are dependent upon the at least one calendaring and scheduling server 20 receiving notification that the scheduled user service is an actualized event. The servers of the corporate accounting billing system 80 and the travel agency ticket payment 90 are included in the network 16 but have not been illustrated in FIG. 1.

Actualized events also have an effect on planned events when a conflict is detected with the software of the at least one calendaring and scheduling server 20. The top arrow leading from "actualized events" to "planned events" shows that an event 50 at an earlier time had to be rescheduled into an event 60 occurring in the future. The reason that rescheduling occurs is that the software detects that a scheduling conflict exists and further interaction through the communication system 16 with at least one scheduling server 20 has occurred and optionally with the user, to reschedule the scheduled event with either the same user service provider 27 or another user service provider which offered the same or other service at a later time. The selection of the new event 60 can be based upon the profile of the user stored in the at least one calendaring and scheduling server 20. The database of the calendar and scheduling server storing the profile of the user includes not only the identification of one or more preferred user service providers 27 through which the user desires to select rescheduling of services, such as preferred airline carriers, but also includes additional information including, but not limited to, the time when services are preferred to be scheduled, information regarding pricing and any additional information that the user wishes to be utilized in the decision to be made by the software when a conflict exists. The second actualized event 70 represents a circumstance in which a scheduling conflict has been detected but the service which is the subject of the scheduling conflict could not be rescheduled as indicated by the head of the arrow ending in an event window without a reference numeral. The arrow 70 to the left and downward points to the subsequent block in time at which the attempt to reschedule was made but which was unsuccessful.

The viewing of the display 14 notifies the user of all aspects of the user's calendar including alerts, notifications, and suggestions for scheduling or rescheduling. The user, in response to the display 14 that a conflict exists, which may be based upon the software being informed of the actual or scheduled location of the user, chooses a particular user service provider 27 which may be defined in terms of location, time and other details which is communicated to at least one user service server 28. When original scheduling is performed, the particular user service provider 27 is chosen by the software determining which user service provider of one or more user service providers which offer the scheduled service are preferred by the user's personal profile and which permit the scheduled service to be provided to the user without a scheduling conflict.

Figure 5:
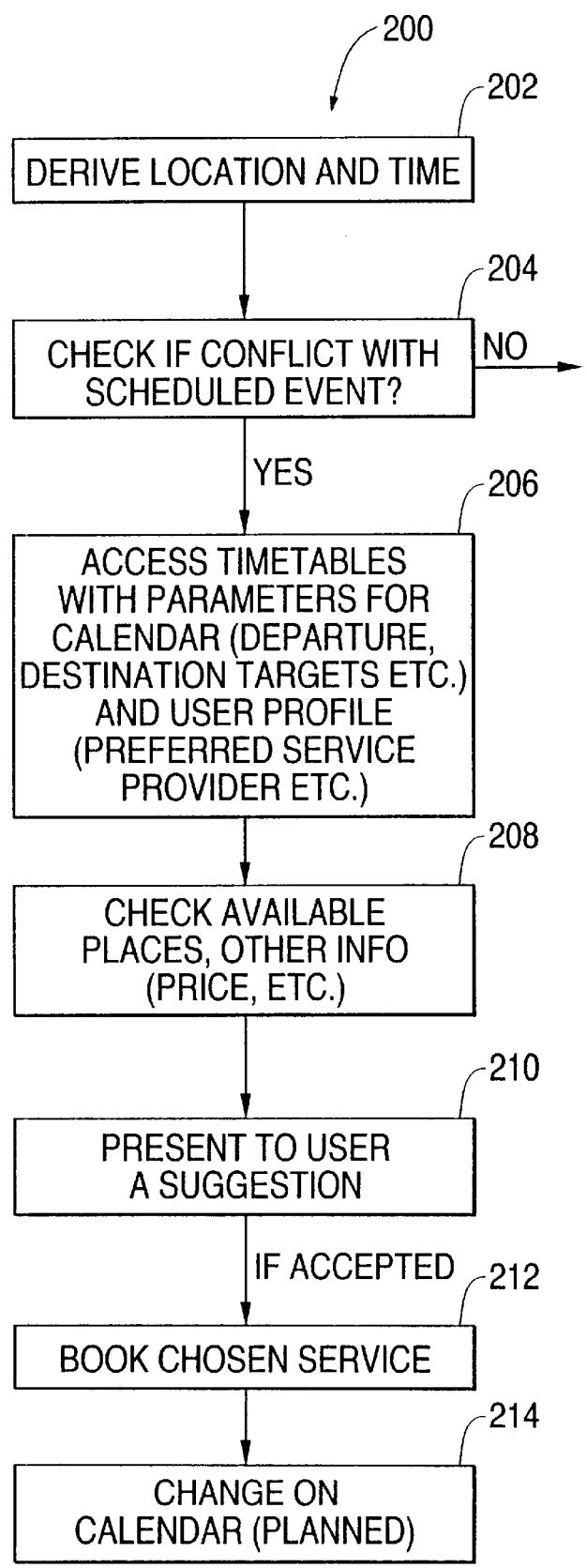
FIG. 5 is a flow chart illustrating the operation of the scheduling software rescheduling events once a conflict in schedule has been detected as a result of the user's current position.

FIG. 5 illustrates a flow chart 200 illustrating the operation of the software of the at least one calendaring and scheduling server 20 of the present invention to detect when a conflict exists which prevents the user of the mobile terminal 12 from receiving the scheduled service and how communications with the at least one calendaring and scheduling server 20 are managed to reschedule the scheduled service so that the conflict does not exist. At the beginning of the process, the current or scheduled location and time are derived at starting point 202. If the current position of the mobile terminal 12 is used by the software, either the GPS receiver 36 or a position detecting function associated with a cellular carrier of the communication system 16 provides location communications to which results in the current location being stored by the at least one calendaring and scheduling server 20. Alternatively, at point 202, the scheduled location of a scheduled event is derived by the software determining the scheduled location, e.g. from data in memory of the at least one calendaring and scheduling server 20 storing the event locations, time, etc. of scheduled events in the calendar displayed in FIG. 3. The process then proceeds to decision point 204 where the software checks if a conflict exists with a scheduled user service, such as an airline flight, which has a particular place of origination and time.

The determination of when a conflict exists can be done in numerous ways which take into account one or more variables which all are a function of the current or scheduled location of the user as determined at point 202 and at least the time of the scheduled service and its place(s) of occurrence. For example, if an airline flight were scheduled for a departure time which would require the user 22 to drive at a speed substantially above the speed limit in order to cover the distance between the airport and the user's current location, the software would indicate that a conflict exists with the current schedule. A determination of the conflict could be simply made by computing the distance between the scheduled service and the current location and dividing that by the maximum possible speed of travel to determine if it was physically impossible to arrive at the airport. Obviously, much more sophisticated algorithms may be used for determining if a conflict can be utilized with the present invention not being limited to any particular conflict algorithm. Similarly, diverse types of algorithms may be used to schedule services for the first time from user service providers 27 and to generate alerts.

The operation of the scheduling software proceeds from decision point 204 where a determination is made if a conflict with a scheduled event exists. If the answer is "no" at decision point 204, processing stops. If the answer is "yes" at decision point 204, processing proceeds to point 206 where the at least one calendaring and scheduling server 20 communicates with one or more user service provider servers 28 to access timetables with parameters for the calendar, such as departure, destination targets, etc. Furthermore, the profile(s) of the user, is accessed which may be without limitation a preference of a service provider, etc. The processing proceeds to point 208 where the software communicates with the one or more user service provider server(s) 28 to determine available reservations with the user service provider(s) 27 and any other information, such as price, etc., involved with the rescheduling of the service through the at least one scheduling server. Processing proceeds to point 210 where the software causes the display 14 of the personal calendar of the mobile terminal 12 to present to the user a suggestion of substitute services. The user answers back and advises the software if the suggestion at point 210 is accepted. If accepted, the processing proceeds to point 212 where the chosen service is booked by one of the user provider service servers 28. Finally, processing proceeds to point 214 where changing of the display 14 of the calendar of planned activities (future) is made so that, for example, the display of FIG. 3 on the display 14 would be updated to include a new airline flight.

The initial scheduling of a service from a service provider in response to the actual or scheduled location of the mobile terminal 12 requires the software to determine, with any of various algorithms, when a scheduling conflict does not exist between each of the scheduled locations of the events in the calendar and a user service provider's 27 offering a service to the user at a particular location. This determination is analogous to determining when the actual position of the mobile terminal causes the software to indicate that a scheduling conflict exists with a future scheduled service which necessitates rescheduling.

EXAMPLES

Assume that the user is making plans for forthcoming events and is entering new events in the user's calendar. Next week, the user will be going to India and so an event, for example, stretching over seven days, is entered together with the location of "Delhi, India". In addition to this scheduled user service, the user will also enter scheduled user service of there being a flight to India. The calendaring and scheduling server 20 is configured to help the user in making plans. The first thing to happen is that the calendaring and scheduling server 20 will recognize that a flight is to occur and will ask the user whether the user would like a flight to be booked. If the user does not require a flight to be booked, then the procedure will stop there, but if the user does, then the calendaring and scheduling server 20 will refer to the user's profile to identify the user's preferred airline. This can be checked with the user who can confirm that this airline is to be used on this occasion or can choose a different airline. The user can choose a different airline by choosing another option presented on the mobile terminal 12 by the calendaring and scheduling server 20 or by acting independently and making personal arrangements. Independently made arrangements can also be included in the calendar. Once a suitable airline has been identified, the calendaring and scheduling server 20 can book the user's flight. This can involve the user dealing directly with the airline user service provider server 28. In more advanced systems, the calendaring and scheduling server 20 can make the booking itself once it has gathered suitable information from the user (e.g., finding out from the airline server what information is required). Of course, if there is no preferred airline listed in the profile, the calendaring and scheduling server 20 can search for a suitable airline travelling to that destination and present it to the user as a choice.

Other arrangements dependent upon the new location of the user resultant from the completion of the scheduled user service can be made. Once the calendaring and scheduling server 20 has determined that there will be a flight from the airport, it can book a taxi with the participation of the user. It can obtain from the user details of whether a taxi is required and where and when the taxi is to pick up the user. Since the calendaring and scheduling server 20 will be able to determine that the user is scheduled to be at home before leaving to catch the flight, it can present this location as a menu choice, for example, the first choice among several. In addition, since the calendaring and scheduling server 20 will be able to find out from the airline server 28 the check-in time a the airport, it can also propose a suitable pick-up time from the user's home. The calendaring and scheduling server 20 can likewise arrange a taxi for a return journey back form the airport. In this case, the invention can provide further benefits. If the flight is running late, or if the user has arranged to be on a different flight, the calendaring and scheduling server 20 can reschedule the taxi. One of the benefits of the invention; is since the calendaring and scheduling server 20 is not mobile, then it can continue to schedule and reschedule while the user is out of communication with the wireless network. This can be useful in the case of a schedule changing while a user is on an aircraft, for example, when the flight is being delayed.

Once the calendaring and scheduling server 20 has identified that the user will be staying in a location away from home, for example in India, it can also arrange to book hotels, hire cars or whatever, by following a procedure similar to that outlined above for flights. Again, if a profile is available, the calendaring and scheduling server 20 may use this as the basis to order a service from a third party. Nowadays, many of the user service providers in the world have a global rather than a national presence and it is possible to arrange hotel accommodation and car hire from the same organization in many parts of the globe.

From the above it will also be appreciated that certain tasks can be left to the calendaring and scheduling server 20. In the example given above of a flight connecting with a taxi, the calendaring and scheduling server 20 can check on arrangements independently of the user to make sure that there are no schedule changes. For example, before a flight has landed it can interrogate the airline user service provider server 28, perhaps 2 hours, 1 hour and ½ hour before the scheduled landing time to make sure that it is keeping to its schedule. If not, the taxi can be rescheduled.

The invention is not restricted to scheduling business-related matters. It can also help with scheduling social matters. For example, the user may enter the event "theater" into the calendar. The calendaring and scheduling server 20 will refer to the user profile and check which theaters are preferred by the user and then present a list of theaters. This list can be provided ranked into an order based upon those theaters which the user has visited previously and the number of visits. The user can then review the list and review the performances and then make a choice. Of course, a theater not shown on the list may be selected if the user so wishes. Once the user has chosen, the calendaring and scheduling server 20 can interact with the user service provider server 28 and book the tickets.

The foregoing only gives theaters as an example. The invention can be applied to other social events such as musical concerts and meals in restaurants. For example, when a meal in a restaurant is being planned, a particular restaurant can be identified, either with the assistance of the calendaring and scheduling server 20 or not, and the terminal, in conjunction with the calendaring and scheduling server 20, can assist the user in making a booking or in presenting menu information for the user or review.

In scheduling the theater event, the user may include a location in the appropriate field, for example, the user may state that the event is to take place in Helsinki, or may not. If the user includes a location, the calendaring and scheduling server 20 can obtain the relevant information based on the scheduled location. If the user does not, the calendaring and scheduling server 20 may simply determine that since no location is given (either for that event or for the time period in which it takes place), then the event should be taking place in the user's home location, and thus it selects theaters accordingly. If the theater event takes place during the time that another scheduled user service occurs (for example a weekend trip to London), the theater scheduled user service is a sub-event of the trip event. In this case, the information on the location of the trip event may be used, and London theaters and relevant performances offered to the user from which he can choose.

It may be that the profile does not contain any entry for "theaters" or whatever social event is being scheduled. In this case the calendaring and scheduling server 20 will simply obtain relevant information concerning theaters from user service provider servers 28 to enable the user to make his choice.

The calendaring and scheduling server 20 handles matters other than making bookings and reservations. In the example of the trip to India described above, the user's profile in the calendaring and scheduling server 20 can contain a home list of information services that the user likes to have available when in the home location and an away list of information services that the user likes to have when travelling away from home. Such information services could be those which can be accessed from the mobile terminal 12 and sent thereto. The services may include services available from mobile access of the internet. The away list can include weather reports, general news of the location to be visited and specific news, for example business news of the location to be visited. In the case of a trip to another country being scheduled, the calendaring and scheduling server 20 could provide to the user details of the major news stories reporting what is happening in that country in the weeks preceding the visit. This can provide the user with the opportunity to change schedule in response to major events. As mentioned earlier, news and weather are also scheduled services, which are available on-line, and are location related. The do not require provision of a "real service" in the physical world.

The profile may be arranged to provide the user with information services which are normally available in the user's home location but which are not available when away from home. For example, this can be domestic news for the user's own country which is normally obtained from the television or from domestic newspapers. In this case, when the user is away, the user can continue to receive information which the user usually has. The benefit of the invention is that this can occur automatically.

In addition, map information may be provided. This can be particularly useful if coordinated with the locations at which the user will be arriving, staying and visiting while in a country. Part of the profile of the user may include special interests, for example art exhibitions, and the user can be notified of matters which may be of interest and have places of interest identified or highlighted on the maps which are provided to the user.

The calendaring and scheduling server 20 does not only assist in scheduling when the user travels to another country but also assists when the user is scheduling user services which are domestically located, for example in the user's own country. If the user is scheduling a user service which requires a domestic journey, for example overland, the calendaring and scheduling server 20 may seek to arrange train tickets or car rental and hotel accommodations as required.

It should also be noted that rescheduling can occur in different ways due to the effect of the invention. Since the calendaring and scheduling server 20 can communicate with user service provider servers 28, then the calendaring and scheduling server can receive from the service providers information about rescheduling of a scheduled service, for example a flight or a concert and reschedule the calendar accordingly. This could be done with the user's consent or simply be done automatically once notification occurs. Of course, rescheduling of the scheduled service could lead to calendar conflicts in which case conflict resolution would be applied. Another use of the invention is that when scheduled service is changed, for example, the trip to India in the example above is either cancelled or rescheduled to occur over a different time period, the calendaring and scheduling server 20 can also reschedule the provision of information service providers 25 (weather, etc.) so that they are likewise cancelled or likewise provided over a different time period.

Calendar conflicts may arise as a result of scheduling, rescheduling (especially when the calendaring and scheduling server 20 has some degree of control over the calendar of the user) or might arise as a result of the physical location of the calendar relative to the locations of other events. Consequently, the user services might need to be rescheduled.

The calendaring and scheduling server 20 can also provide the user with reminders. For example, the user may have met a colleague in a coffee house to have coffee before going to a restaurant. If the user does not leave the coffee house by the time the user is due to be at the restaurant or in good time to arrive at the restaurant in time, then the calendaring and scheduling server 20 can instruct the mobile terminal 12 to give an alert.

As represented by FIG. 4, once a scheduled user service has been completed, that is actualized, other matters connected to the scheduled user service can then take place. For example, it may be that a scheduled user service involves a car journey form one city to another. The distance between the cities is known. If the user makes the journey in a personal car, the user might be entitled to claim for the cost of the journey, for example from the user's company. Once the time over which the scheduled user service was scheduled has passed, the calendaring and scheduling server 20 can ask the user to confirm that the event did indeed take place and interact with the user to make the necessary claim. This may involve the preparation of paperwork or may simply be to take a series of inputs from the user. It will be appreciated that this function is independent of calendar conflicts. It is also independent of current location. Other examples may involve payment-per-use items, reimbursement of costs, etc.

While the invention has been described in terms of its preferred embodiments, it should be understood that numerous modifications may be made thereto without departing from the spirit and scope of the present invention. It is intended that all such modifications fall within the scope of the appended claims.

What is claimed is:

1. A system providing calendar services comprising:
a mobile terminal including a display, a processor which controls providing a display on the display of a calendar of a user of the mobile terminal including scheduled calendar user services which are provided to the user of the mobile terminal by at least one user service provider server and have associated therewith a scheduled time and at least one location for which the user service is provided to the user;
at least one calendaring and scheduling server providing the mobile terminal with a schedule of the scheduled calendar user services which is maintained by the at least one calendaring and scheduling server and which is displayed by the display under control of the processor, the at least one calendaring and scheduling server executing software, which is responsive to a stored location to schedule at least one scheduled calendar user service for the user of the mobile terminal and when a schedule conflict exists with a scheduled service, the at least one calendaring and scheduling server communicates with the at least one user service provider server and changes the schedule to avoid the conflict; and
a communication system providing communications between the mobile terminal and the at least one calendaring and scheduling server and between the at least one calendaring and scheduling server and the at least one user service provider server; and wherein
the schedule of scheduled calendar user services and changes of the schedule to avoid conflict is maintained solely by the at least one calendaring and scheduling server.

2. A system in accordance with claim 1 wherein:
the stored location is a physical location of the mobile terminal.

3. A system in accordance with claim 1 wherein:
the stored location is a stored physical location for which the calendaring and scheduling server has scheduled a scheduled calendar user service to be provided to the user.

4. A system in accordance with claim 1 wherein:
the conflict is at a specified time or physical location.

5. A system in accordance with claim 1 further comprising:
at least one information provider server, in communication with the at least one calendaring and scheduling server, which provides calendar information service by providing information which is stored by the at least one information provider server to the user by transmission with the communication system to the mobile terminal under control of one of the at least one calendaring and scheduling server.

6. A system in accordance with claim 5 wherein:
the calendar information service provided by the at least one information provider server is selected as a function of a location stored in at least one calendaring and scheduling server associated with a scheduled calendar user service.

7. A system in accordance with claim 6 wherein:
the information provided by the at least one information provider server is transmitted to the user of the mobile terminal after the user has moved to a new physical location stored in the at least one calendaring and scheduling server and is information selected to be useful to the user at the new physical location.

8. A system in accordance with claim 1 comprising:
a user profile server which stores a profile of the user providing information about preferences of the user regarding the scheduled calendar services and changing a scheduled service to avoid conflict; and wherein
the at least one calendaring and scheduling server stores information displayed by the display under control of the processor; and
the software of the at least one calendaring and scheduling server accesses the profile of the user and uses the profile of the user in providing at least the scheduled calendar user services to the user of the mobile terminal and to change the schedule to avoid conflict.

9. A system in accordance with claim 8 wherein:
the profile of the user contains at least one preferred user service provider which may be chosen to provide service to the user and the at least one preferred user service provider is given preference by the software in scheduling the scheduled calendar user services over any other user service provider which may be chosen to provide the user the scheduled calendar user services.

10. A system in accordance with claim 8 wherein:
the user profile stores additional information for selecting between a plurality of user service providers to provide more than one scheduled calendar user service to the user.

11. A system in accordance with claim 9 wherein:
the user profile stores additional information for selecting between a plurality of user service providers to provide more than one scheduled calendar user service to the user.

12. A system in accordance with claim 4 comprising:
a user profile server which stores a profile of the user providing information about preferences of the user regarding the scheduled calendar server and changing a scheduled service to avoid conflict; and wherein
the at least one calendaring and scheduling server stores information displayed by the display under control of the processor; and
the software of the at least one calendaring and scheduling server accesses the profile of the user and uses the profile of the user in providing at least the scheduled calendar user services to the user of the mobile terminal and to change the schedule to avoid conflict.

13. A system in accordance with claim 12 wherein:
the profile of the user contains at least one preferred user service provider which may be chosen to provide service to the user and the at least one preferred user service provider is given preference by the software in scheduling the scheduled calendar user services over any other user service provider which may be chosen to provide the user the scheduled calendar user services.

14. A system in accordance with claim 12 wherein:
the user profile stores additional information for selecting between a plurality of user service providers to provide more than one scheduled calendar user service to the user.

15. A system in accordance with claim 13 wherein:
the user profile stores additional information for selecting between a plurality of user service providers to provide more than one scheduled calendar user service to the user.

16. A system in accordance with claim 5 comprising:
a user profile server which stores a profile of the user providing information about preferences of the user regarding the scheduled calendar server and changing a scheduled service to avoid conflict; and wherein
the at least one calendaring and scheduling server stores information displayed by the display under control of the processor; and
the software of the at least one calendaring and scheduling server accesses the profile of the user and uses the profile of the user in providing at least the scheduled calendar user services to the user of the mobile terminal and to change the schedule to avoid conflict.

17. A system in accordance with claim 16 wherein:
the profile of the user contains at least one preferred user service provider which may be chosen to provide service to the user and the at least one preferred user service provider is given preference by the software in scheduling the scheduled calendar user services over any other user service provider which may be chosen to provide the user the scheduled calendar user services.

18. A system in accordance with claim 16 wherein:
the user profile stores additional information for selecting between a plurality of user service providers to provide more than one scheduled calendar user service to the user.

19. A system in accordance with claim 17 wherein:
the user profile stores additional information for selecting between a plurality of user service providers to provide more than one scheduled calendar user service to the user.

20. A system in accordance with claim 1 wherein:
the software of the at least one calendar and scheduling server further is responsive to the physical location stored therein to generate an alert which is transmitted to the mobile terminal which informs the user that the user should perform an unscheduled activity while the user is in a physical proximity to the stored physical location.

21. A system in accordance with claim 20 wherein:
the unscheduled activity is an activity which may be performed by the user independent of time.

22. A system in accordance with claim 4 wherein:
the software at least one calendar and scheduling server further is responsive to the physical location stored therein to generate an alert which is transmitted to the mobile terminal which informs the user that the user should perform an unscheduled activity while the user is in a physical proximity to the stored physical location.

23. A system in accordance with claim 22 wherein:
the unscheduled action is an activity which may be performed by the user independent of time.

24. A system in accordance with claim 5 wherein:
the software at least one calendar and scheduling server further is responsive to the physical location stored therein to generate an alert which is transmitted to the mobile terminal which informs the user that the user should perform an unscheduled activity while the user is in a physical proximity to the stored physical location.

25. A system in accordance with claim 24 wherein:
the unscheduled activity is an activity which may be performed by the user independent of time.

26. A system in accordance with claim 6 wherein:
the software of the at least one calendar and scheduling server further is responsive to the physical location stored therein to generate an alert which is transmitted to the mobile terminal which informs the user that the user should perform an unscheduled activity while the user is in a physical proximity to the stored physical location.

27. A system in accordance with claim 26 wherein:
the unscheduled activity is an activity which may be performed by the user independent of time.

28. A system in accordance with claim 7 wherein:
the software of the at least one calendar and scheduling server further is responsive to the physical location stored therein to generate an alert which is transmitted to the mobile terminal which informs the user that the user should perform an unscheduled activity while the user is in a physical proximity to the stored physical location.

29. A system in accordance with claim 28 wherein:
the unscheduled activity is an activity which may be performed by the user independent of time.

30. A system in accordance with claim 8 wherein:
the software of the at least one calendar and scheduling server further is responsive to the physical location stored therein to generate an alert which is transmitted to the mobile terminal which informs the user that the user should perform an unscheduled activity while the user is in a physical proximity to the physical location.

31. A system in accordance with claim 30 wherein:
the unscheduled activity is an activity which may be performed by the user independent of time.

32. A system in accordance with claim 9 wherein:
the software of the at least one calendar and scheduling server further is responsive to the physical location stored therein to generate an alert which is transmitted to the mobile terminal which informs the user that the user should perform an unscheduled activity while the user is in a physical proximity to the physical location.

33. A system in accordance with claim 32 wherein:
the unscheduled activity is an activity which may be performed by the user independent of time.

34. A system in accordance with claim 10 wherein:
the software of the at least one calendar and scheduling server further is responsive to the physical location stored therein to generate an alert which is transmitted to the mobile terminal which informs the user that the user should perform an unscheduled activity while the user is in a physical proximity to the physical location.

35. A system in accordance with claim 34 wherein:
the unscheduled activity is an activity which may be performed by the user independent of time.

36. A system providing calendar services comprising:
a mobile terminal including a display, a processor which controls providing a display on the display of a calendar of a user of the mobile terminal including scheduled calendar services which are provided to the user of the mobile terminal by at least one service provider server; and
at least one calendaring and scheduling server providing the mobile terminal with a calendar of events which are displayed by the display under the control of the calendar software, the at least one calendaring and scheduling server executing software which is responsive to a stored physical location where the user is scheduled by the software of the at least one calendaring and scheduling server to be present to generate an alert which is transmitted to the mobile terminal which informs the user that the user should perform an activity independent of time while the user is in physical proximity to the stored physical location and when a conflict of calendar events exists, the at least one calendaring and scheduling server communicates with the at least one service provider server and changes the schedule to avoid the conflict; and wherein the schedule of scheduled calendar user services and changes of the schedule to avoid conflict is maintained solely by the at least one calendaring and scheduling server.

37. A system in accordance with claim 36 wherein:
the stored physical location is the physical location of the mobile terminal.

38. A system in accordance with claim 36 wherein:
the stored physical location is a physical location at which the calendaring and scheduling server has scheduled a calendar user service to be provided to the user.

39. A method of providing calendar services in a system including a mobile terminal including a display, a processor which controls providing a display on the display of a calendar of a user of the mobile terminal including scheduled calendar user services which are provided to the user of the mobile terminal by at least one user service provider server and have associated therewith a scheduled time and at least one location for which the user service is provided to the user, at least one calendaring and scheduling server providing the mobile terminal with a schedule of the scheduled calendar user services which is maintained by the at least one calendar scheduling server and which is displayed by the display under control of the processor, the at least one calendaring and scheduling server executing software, which is responsive to a stored location to schedule at least one scheduled calendar user service for the user of the mobile terminal and a communication system providing communications between the mobile terminal and the at least one calendaring and scheduling server and between the at least one calendaring scheduling server and the at least one user service provider server comprising:

storing a location in one of the at least one calendaring and scheduling server;

in response to the stored location, the software of the one calendaring and scheduling server schedules at least one scheduled calendar user service for the user and when a schedule conflict exists with a scheduled service, the at least one calendaring and scheduling server communicates with the at least one service provider server and changes the schedule to avoid the conflict;

transmitting the at least one scheduled calendar user service for the user to the mobile terminal; and displaying the at least one scheduled calendar user service on the display; and wherein the schedule of scheduled calendar user services and chances of the schedule to avoid conflict is maintained solely by the at least one calendaring and scheduling server.

40. A method in accordance with claim 39 wherein:
the stored location is a physical location of the mobile terminal.

41. A method in accordance with claim 39 wherein:
the stored location is a physical location for which the calendaring and scheduling server has scheduled a scheduled calendar service to be provided to the user.

42. A method in accordance with claim 39 wherein:
the conflict is at a specified time or physical location.

43. A method in accordance with claim 39 wherein:
at least one information provider server, in communication with the at least one calendaring and scheduling server, which provides calendar information service by providing information which is stored by the at least one information provider server to the user by transmission with the communication system to the mobile terminal under control of one of the at least one calendaring and scheduling server.

44. A method in accordance with claim 43 wherein:
the calendar information service provided by the at least one information provider server is selected as a function of a location stored in at least one calendaring and scheduling server associated with a scheduled calendar user service.

45. A method in accordance with claim 44 wherein:
the information provided by the at least one information provider server is transmitted to the user of the mobile terminal after the user has moved to a new physical location stored in the at least one calendaring and scheduling server and is information selected to be useful to the user at the new physical location.

46. A method in accordance with claim 39 comprising:
a user profile server which stores a profile of the user providing information about preferences of the user regarding the scheduled calendar server and changing a scheduled service to avoid conflict; and wherein the at least one calendaring and scheduling server stores information displayed by the display under control of the processor; and the software of the at least one calendaring and scheduling server accesses the profile of the user and uses the profile of the user in providing at least the scheduled calendar user services to the user of the mobile terminal and to change the schedule to avoid conflict.

47. A method in accordance with claim 46 wherein:
the profile of the user contains at least one preferred user service provider which may be chosen to provide service to the user and the at least one preferred user service provider is given preference by the software in scheduling the scheduled calendar user services over any other user service provider which may be chosen to provide the user the scheduled calendar user services.

48. A system in accordance with claim 46 wherein:
the user profile stores additional information for selecting between a plurality of user service providers to provide more than one scheduled calendar user service to the user.

49. A system in accordance with claim 47 wherein:
the user profile stores additional information for selecting between a plurality of user service providers to provide more than one scheduled calendar user service to the user.

50. A method in accordance with claim 42 comprising:
a user profile server which stores a profile of the user providing information about preferences of the user regarding the scheduled calendar server and changing a scheduled service to avoid conflict; and wherein the at least one calendaring and scheduling server stores information displayed by the display under control of the processor; and the software of the at least one calendaring and scheduling server accesses the profile of the user and uses the profile of the user in providing at least the scheduled calendar user services to the user of the mobile terminal and to change the schedule to avoid conflict.

51. A method in accordance with claim 50 wherein:
the profile of the user contains at least one preferred user service provider which may be chosen to provide service to the user and the at least one preferred user service provider is given preference by the software in scheduling the scheduled calendar user services over any other user service provider which may be chosen to provide the user the scheduled calendar user services.

52. A system in accordance with claim 50 wherein:
the user profile stores additional information for selecting between a plurality of user service providers to provide more than one scheduled calendar user service to the user.

53. A method in accordance with claim 43 where in:
a user profile server which stores a profile of the user providing information about Preferences of the user regarding the scheduled calendar server and changing a scheduled service to avoid conflict; and wherein
the at least one calendaring and scheduling server stores information displayed by the display under control of the processor; and
the software of the at least one calendaring and scheduling server accesses the profile of the user and uses the profile of the user in providing at least the scheduled calendar user services to the user of the mobile terminal and to change the schedule to avoid conflict.

54. A system in accordance with claim 53 wherein:
the profile of the user contains at least one preferred user service provider which may be chosen to provide service to the user and the at least one preferred user service provider is given preference by the software in scheduling the scheduled calendar user services over any other user service provider which may be chosen to provide the user the scheduled calendar user services.

55. A system in accordance with claim 53 wherein:
the user profile stores additional information for selecting between a plurality of user service providers to provide more than one scheduled calendar user service to the user.

56. A system in accordance with claim 54 wherein:
the user profile stores additional information for selecting between a plurality of user service providers to provide more than one scheduled calendar user service to the user.

57. A method in accordance with claim 39 wherein:
the software of the at least one calendar and scheduling server further is responsive to the physical location stored therein to generate an alert which is transmitted to the mobile terminal which informs the user that the user should perform an unscheduled activity while the user is in a physical proximity to the physical location.

58. A method in accordance with claim 57 wherein:
the unscheduled activity is an activity which may be performed by the user independent of time.

59. A method in accordance with claim 42 wherein:
the software of the at least one calendar and scheduling server further is responsive to the physical location stored therein to generate an alert which is transmitted to the mobile terminal which informs the user that the user should perform an unscheduled activity while the user is in a physical proximity to the physical location.

60. A method in accordance with claim 59 wherein:
the unscheduled activity is an activity which may be performed by the user independent of time.

61. A method in accordance with claim 43 wherein:
the software of the at least one calendar and scheduling server further is responsive to the physical location stored therein to generate an alert which is transmitted to the mobile terminal which informs the user that the user should perform an unscheduled activity while the user is in a physical proximity to the stored physical location.

62. A method in accordance with claim 61 wherein:
the unscheduled activity is an activity which may be performed by the user independent of time.

63. A system in accordance with claim 7 wherein:
the software of the calendar and scheduling server further schedules at least one item in the calendar for the user is associated with the new physical location.

64. A method in accordance with claim 45 wherein:
the software of the calendar and scheduling server further schedules at least one item in the calendar for the user is associated with the new physical location.

65. A system in accordance with claim 63 wherein:
the at least one item is a scheduled user service to be provided to the user while the user is at the new physical location.

66. A system in accordance with claim 63 wherein:
the at least one item is delivery of information to the user from at least one information provider server while the user is at the new physical location.

67. A system in accordance with claim 66 wherein:
the information is subject matter useful to the user while the user is in the new location.

68. A method in accordance with claim 64 wherein:
the at least one item is a scheduled user service to be provided to the user while the user is at the new physical location.

69. A method in accordance with claim 64 wherein:
the at least one item is delivery of information to the user from at least one information provider server while the user is at the new physical location.

70. A system providing calendar services comprising:
a mobile terminal including a display, a processor which controls providing a display on the display of a calendar of a user of the mobile terminal including scheduled calendar user services which are provided to the user of the mobile terminal by at least one user service provider server and have associated therewith a scheduled time and at least one location at which the user service is provided to the user;
at least one calendaring and scheduling server providing the mobile terminal with a schedule of the scheduled calendar user services which is maintained by the at least one calendaring and scheduling server and which is displayed by the display under control of the processor, the at least one calendaring and scheduling server executing software, which is responsive to a stored location, to schedule at least one calendar user service for the user of the mobile terminal and when a schedule conflict exists, the at least one calendaring and scheduling server communicates with the at least one service provider and changes the schedule to avoid the conflict and in response to confirmation that the calendar user service has been completed, schedules at least one additional item related to completion of the calendar user service; and a communication system providing communications between the mobile terminal and the at least one calendaring and scheduling server and between the at least one calendaring and scheduling server and the at least one service provider server; and wherein the schedule of scheduled calendar user services and changes of the schedule to avoid conflict is maintained solely by the at least one calendaring and scheduling server.

71. A system in accordance with claim 70 wherein:

the at least one additional item is independent of a location of the mobile terminal at a time the calendar user service was completed.

72. A method of providing calendar services in a system including a mobile terminal including a display, a processor which controls providing a display on the display of a calendar of a user of the mobile terminal including scheduled calendar user services which are provided to the user of the mobile terminal by at least one service provider server and have associated therewith a scheduled time and at least one location at which the service is provided to the user, at least one calendaring and scheduling server providing the mobile terminal with a schedule of the scheduled calendar services which is maintained by the at least one calendar scheduling server and which is displayed by the display under control of the processor, the at least one calendaring and scheduling server executing software, which is responsive to a stored therein to schedule at least one scheduled calendar user service for the user of the mobile terminal and a communication system providing communications between the mobile terminal and the at least one calendaring and scheduling server and between the at least one calendaring scheduling server and the at least one service provider server comprising:

storing a location in at least one of the at least one calendaring and scheduling server and when a schedule conflict exists, the at least one calendaring and scheduling server communicates with the at least one service provider server and changes the schedule to avoid the conflict;

in response to the stored location, the software of the at least one calendaring and schedules server schedules at least one calendar service for the user and in response to confirmation that the calendar service has been completed, schedules at least one additional item related to completion of a calendar service;

transmitting the at least one scheduled calendar service to the mobile terminal; and displaying the at least one scheduled calendar service on the display; and wherein the schedule of scheduled calendar user services and changes of the schedule to avoid conflict is maintained solely by the at least one calendaring and scheduling server.

73. A method in accordance with claim 72 wherein:

the at least one additional item is independent of a location of the mobile terminal at a time the calendar service has been completed.

74. A system in accordance with claim 1 comprising:

an entity in the system; and wherein when a conflict exists, the at least one calendaring and scheduling server communicates with the entity to change the schedule to avoid the conflict.

75. A method in accordance with claim 39 comprising:

an entity in the system; and wherein when a conflict exists, the at least one calendaring and scheduling server communicates with the entity to change the schedule to avoid the conflict.

76. A system in accordance with claim 70 comprising:

an entity in the system; and wherein when a conflict exists, the at least one calendaring and scheduling server communicates with the entity to change the schedule to avoid the conflict.

77. A system in accordance with claim 72 comprising:

an entity in the system; and wherein when a conflict exists, the at least one calendaring and scheduling server communicates with the entity to change the schedule to avoid the conflict.

78. A system in accordance with claim 8 wherein:

the user profile server is the at least one calendaring and scheduling server.

79. A system in accordance with claim 12 wherein:

the user profile server is the at least one calendaring and scheduling server.

80. A system in accordance with claim 16 wherein:

the user profile server is the at least one calendaring and scheduling server.

81. A system in accordance with claim 36 comprising:

a user profile server which stores a profile of the user providing information about preferences of the user regarding the scheduled calendar services and changing a scheduled service to avoid conflict; and wherein the at least one calendaring and scheduling server stores information displayed by the display under control of the processor; and the software of the at least one calendaring and scheduling server accesses the profile of the user and uses the profile of the user in providing at least the scheduled calendar user services to the user of the mobile terminal and to change the schedule to avoid conflict.

82. A system in accordance with claim 70 comprising:

a user profile server which stores a profile of the user providing information about preferences of the user regarding the scheduled calendar services and changing a scheduled service to avoid conflict; and wherein the at least one calendaring and scheduling server stores information displayed by the display under control of the processor; and the software of the at least one calendaring and scheduling server accesses the profile of the user and uses the profile of the user in providing at least the scheduled calendar user services to the user of the mobile terminal and to change the schedule to avoid conflict.

83. A method in accordance with claim 72 comprising:

a user profile server which stores a profile of the user providing information about preferences of the user regarding the scheduled calendar services and changing a scheduled service to avoid conflict; and wherein the at least one calendaring and scheduling server stores information displayed by the display under control of the processor; and the software of the at least one calendaring and scheduling server accesses the profile of the user and uses the profile of the user in providing at least the scheduled calendar user services to the user of the mobile terminal and to change the schedule to avoid conflict.

84. A system in accordance with claim 82 wherein:

the user profile server is the at least one calendaring and scheduling server.

85. A method in accordance with claim 83 comprising:

the user profile server is the at least one calendaring and scheduling server.

86. A system providing calendar services comprising:

a mobile terminal including a display, a processor which controls providing a display on the display of a calendar of a user of the mobile terminal including scheduled calendar user services which are provided to the user of the mobile terminal by at least one user service provider server and have associated therewith a scheduled time and at least one location for which the user service is provided to the user;

at least one calendaring and scheduling server providing the mobile terminal with a schedule of the scheduled calendar user services which is maintained by the at least one calendaring and scheduling server and which is displayed by the display under control of the processor, the at least one calendaring and scheduling server executing software, which is responsive to a stored location to schedule at least one scheduled calendar user service for the user of the mobile terminal and when a schedule conflict exists with a scheduled service, the at least one calendaring and scheduling server communicates with the at least one user service provider server and changes the schedule to avoid the conflict; and a communication system providing communications between the mobile terminal and the at least one calendaring and scheduling server and between the at least one calendaring and scheduling server and the at least one user service provider server.

87. A system in accordance with claim 86 comprising:

a user profile server which stores a profile of the user providing information about preferences of the user regarding the scheduled calendar services and changing a scheduled service to avoid conflict; and wherein the at least one calendaring and scheduling server stores information displayed by the display under control of the processor; and the software of the at least one calendaring and scheduling server accesses the profile of the user and uses the profile of the user in providing at least the scheduled calendar user services to the user of the mobile terminal and to change the schedule to avoid conflict.

88. A system in accordance with claim 87 wherein:

the user profile server is the at least one calendaring and scheduling server.

\* \* \* \* \*